June 9, 1953
R. E. DAHL
2,641,673
WELDING APPARATUS
Filed March 13, 1951
5 Sheets-Sheet 1
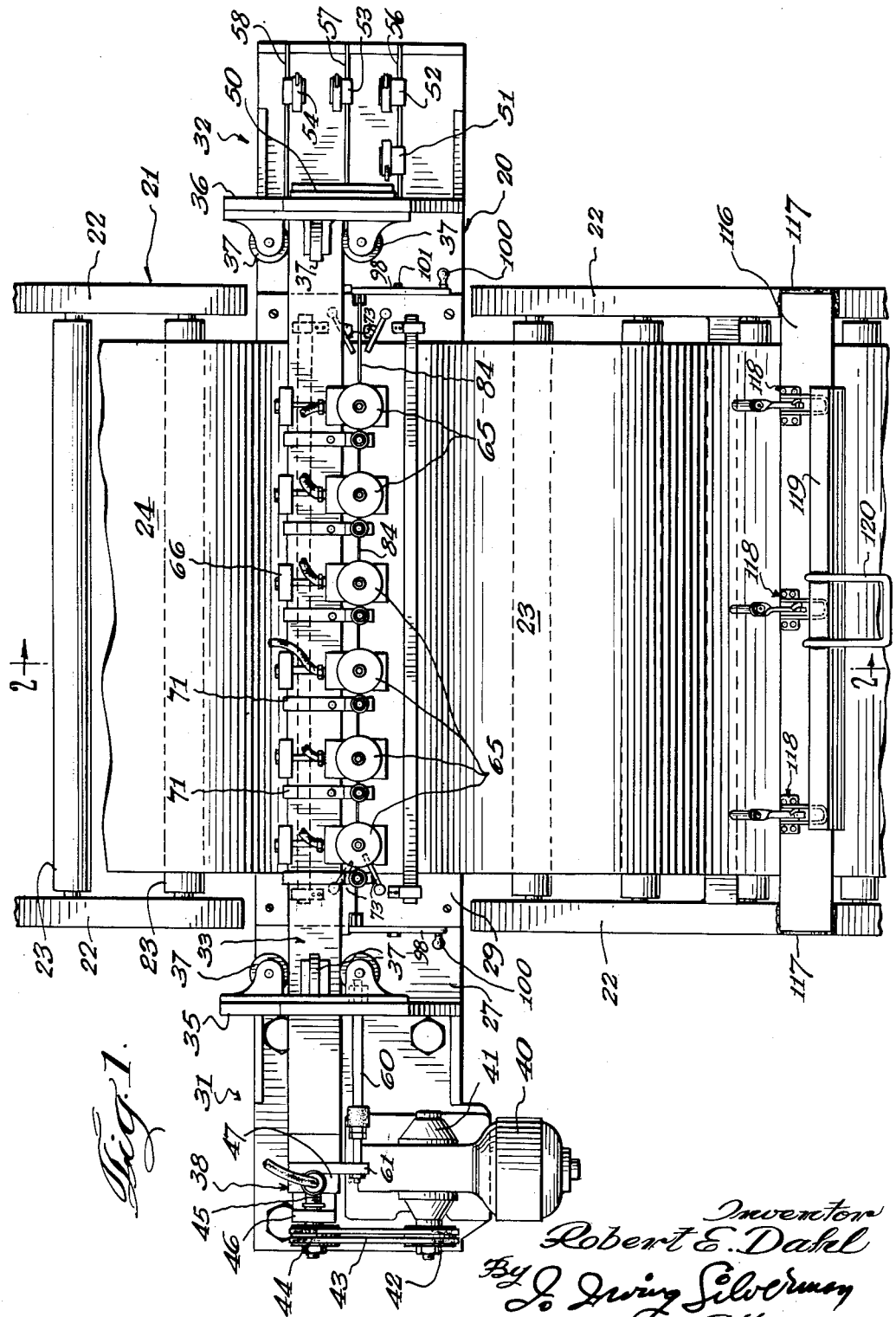

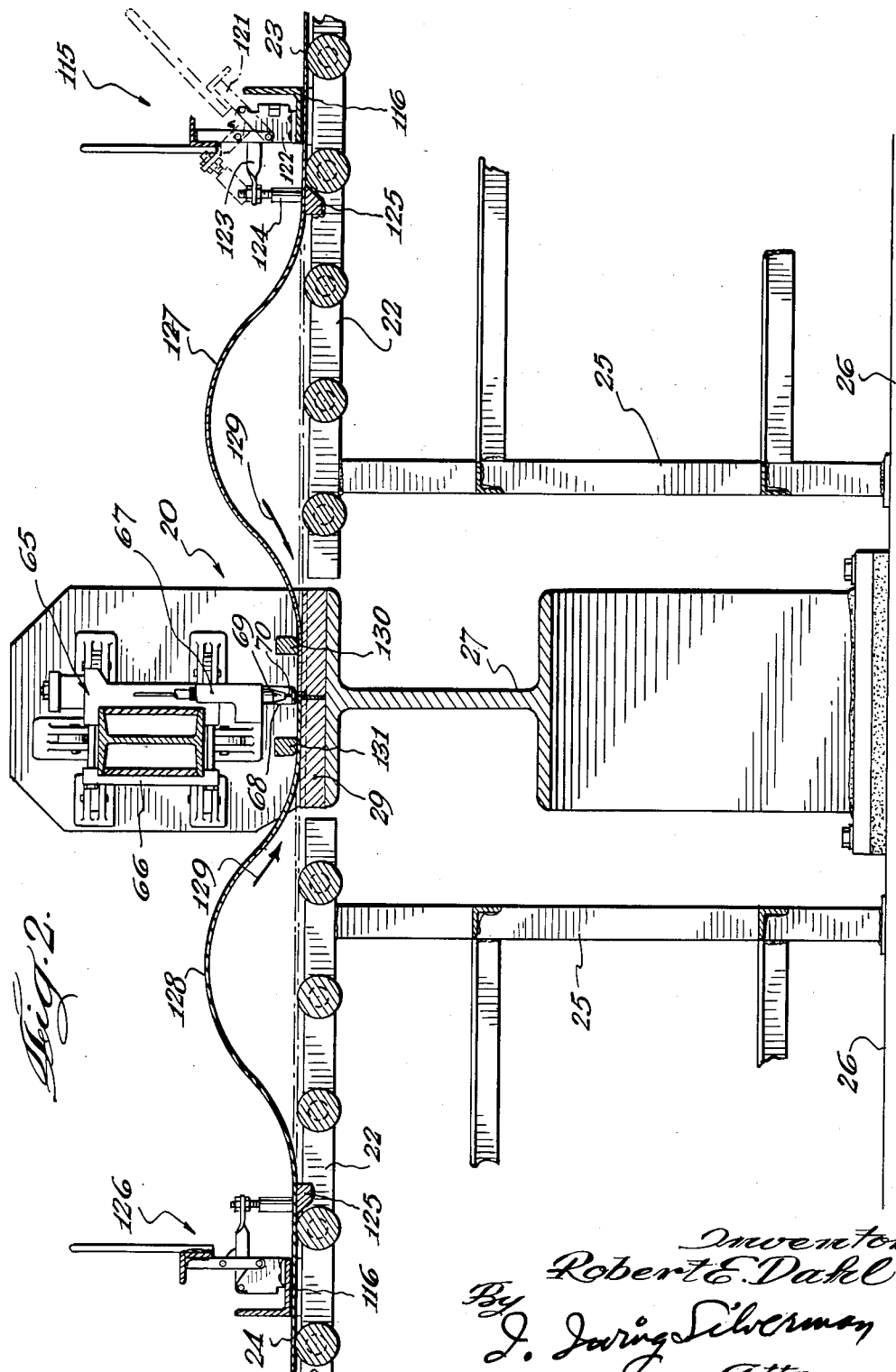

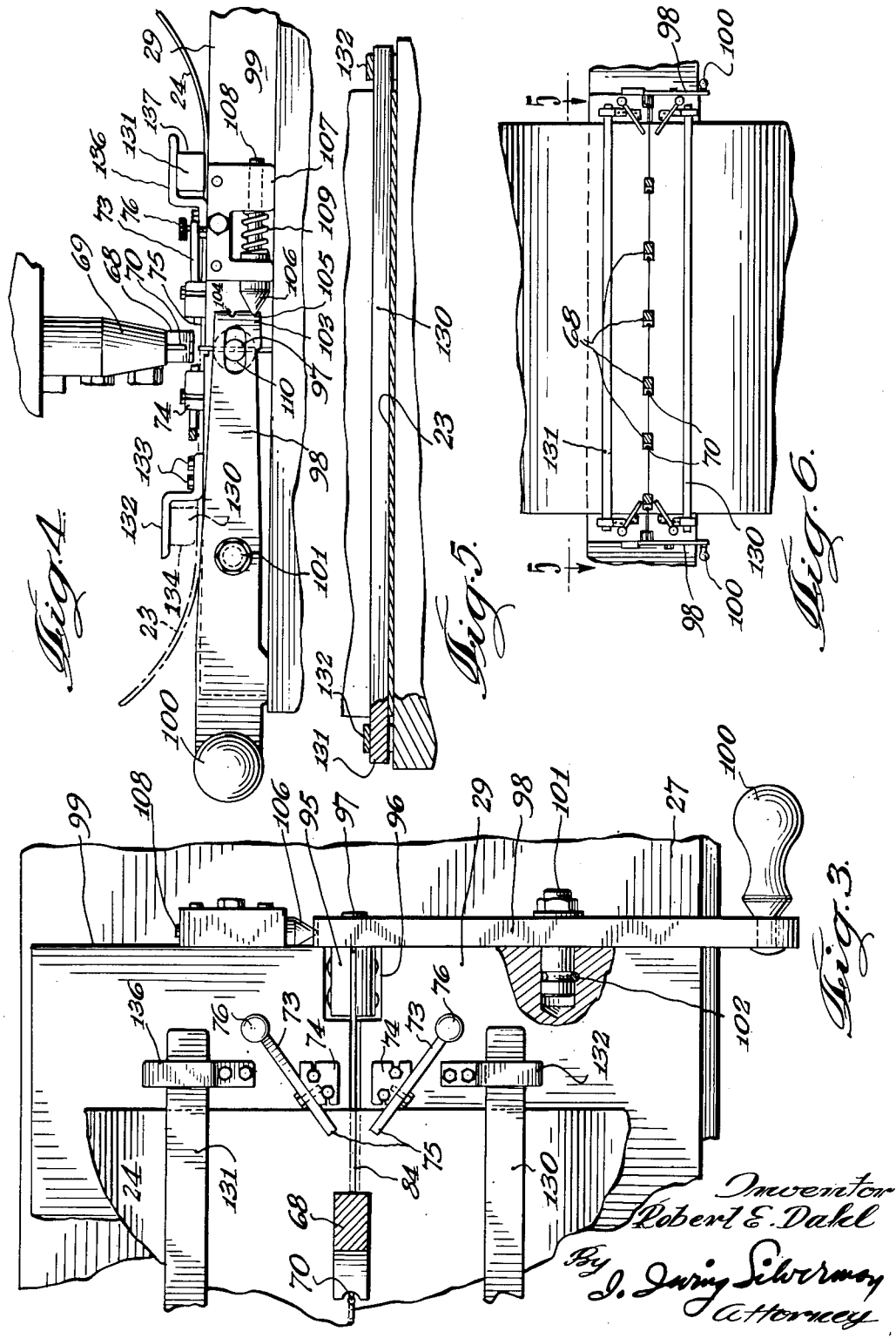

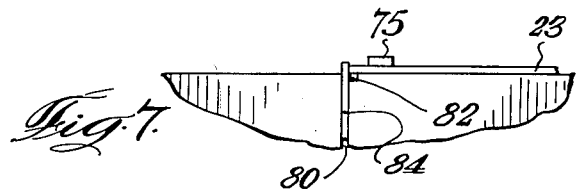
Fig.7.
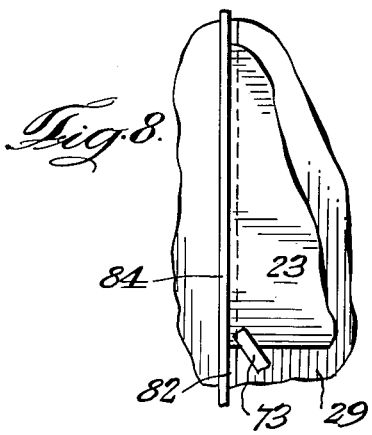
Fig.8.
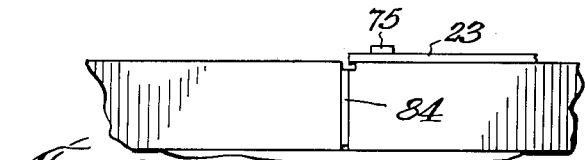
Fig.9.
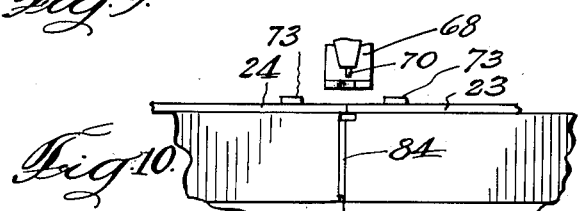
Fig.10.
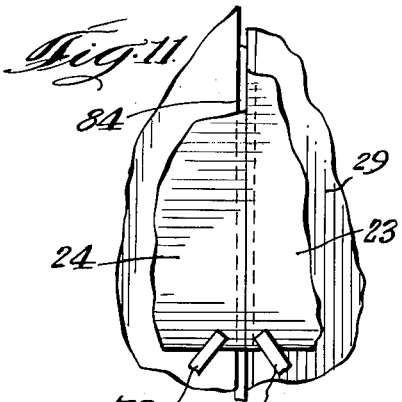
Fig.11.
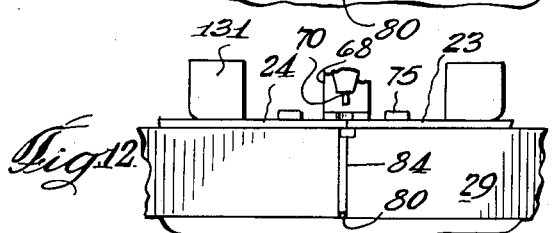
Fig.12.
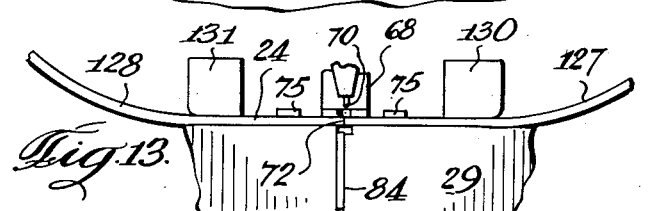
Fig.13.
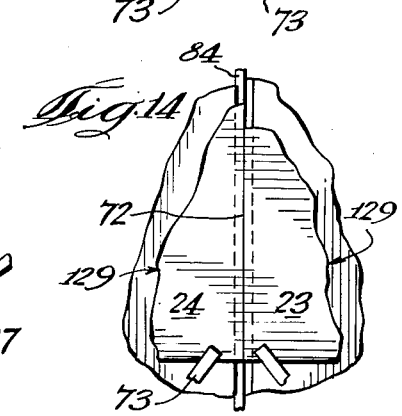
Fig.14.
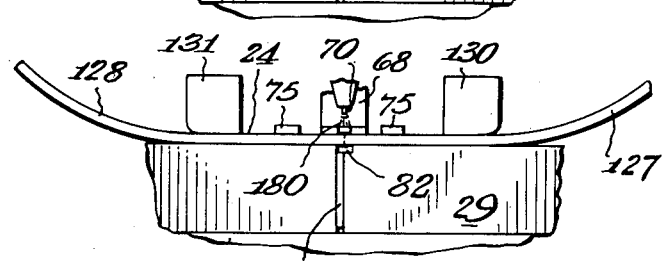
Fig.15.
Inventor
Robert E. Dahl
By L. Irving Silverman
Attorney

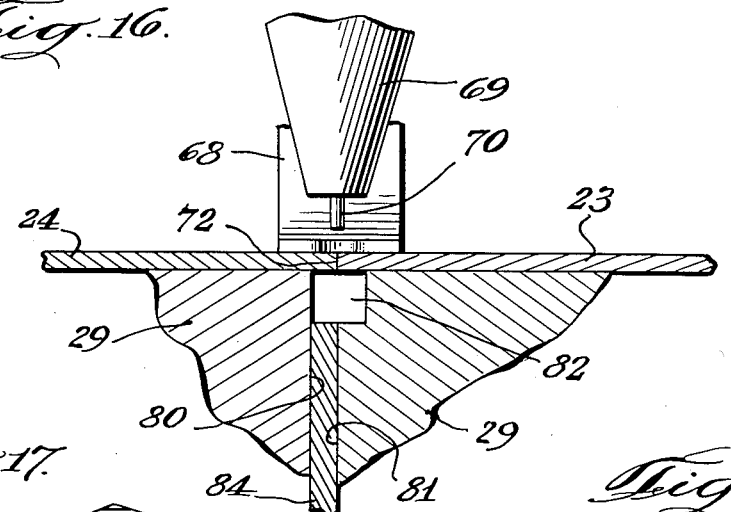
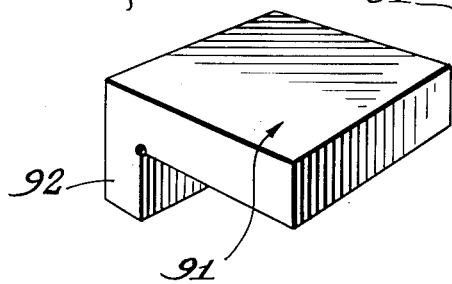
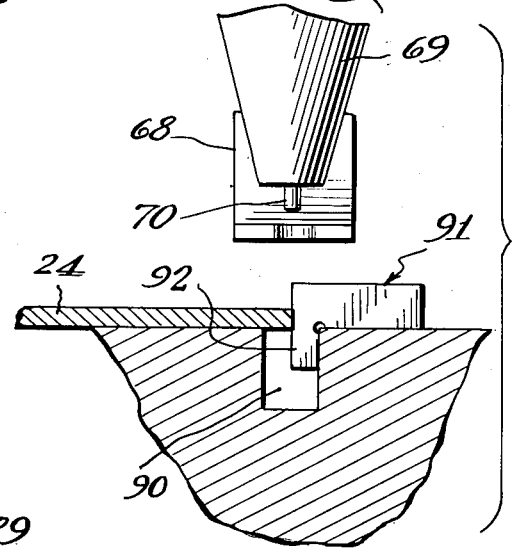
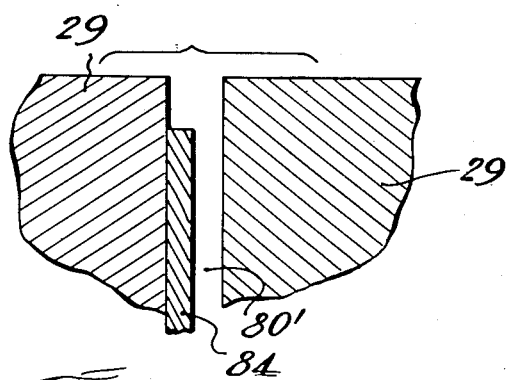

Patented June 9, 1953

2,641,673

UNITED STATES PATENT OFFICE 2,641,673

WELDING APPARATUS

Robert E. Dahl, Hinsdale, Ill., assignor of one-half to Advance Transformer Co., Chicago, Ill., a corporation of Illinois Application March 13, 1951, Serial No. 215,235

4 Claims. (Cl. 219—8)

This invention relates generally to apparatus and a method for welding and more particularly is concerned with apparatus for welding together lengths of electrical silicon steel sheets in order to form same into a large roll of steel, and in addition, to a novel method of accomplishing such welding using inert gas-shielded arcs.

In the electrical industry automatic and semi-automatic presses for stamping laminations are most economically operated when the time lost in re-setting, adjusting, manually removing odd-shaped scrap, and starting a new length is substantially cut down or eliminated. Obviously practically all of the above operations must be performed by the machine operator every time a metal length has been consumed and another must be started through the machine. Accordingly, it has been recognized that the great advantages of a long member are so desirable as to justify the expenditure of large sums in attempting to procure rolls of metal. It has also been recognized that if the metal can be purchased in relatively short lengths, and welded at the shop, great savings can be achieved.

The success of welding the kind of sheet steel suitable for electrical laminations has been limited for a variety of reasons. Silicon steel is difficult to weld except by the inert gas-shielded arc in which a relatively low voltage arc is struck between the workpiece and a substantially non-consumed electrode, and during the electrical discharge the arc is enveloped in an atmosphere of inert gas to prevent oxidation. No flux is needed, and the welds have been found to be highly satisfactory. Another difficulty in the welding of these sheets by any method has been the tendency of the workpiece to buckle and warp. In a co-pending application, Serial No. 214,544, filed March 8, 1951, now U. S. Patent 2,628,301 granted February 10, 1953, I have described and claimed apparatus which overcomes the difficulties of warpage and buckling, and said apparatus in all of its pertinent details has been shown and described herein in connection with my present invention.

Notwithstanding the overcoming of the above referred to difficulties, the handling of extremely thin gauge metal gives rise to other problems, the principal objects of this invention being the satisfactory solution of such problems. The principal problem is the tendency of the abutted edges not to "square off" one against the other. This may take the form of spreading of the abutting or welding juncture at the center thereof, or uneven engagement, or improper positioning caused by workman's error or the like. Other problems are the perfect centering of the juncture, and the maintenance of the juncture during the welding operation.

Other objects of the invention are the provision of novel apparatus for establishing a substantially perfect juncture between the abutting lengths of sheet metal and maintaining the same throughout the welding operation.

Still a further object of the invention is to provide means enabling a length of sheet metal to be pre-loaded to press against its abutting mate at the welding juncture.

Another object of the invention is to provide a method for welding which will include pre-loading the metal members to be welded and maintain the pre-loading during the welding process.

Many other objects will occur to the person skilled in the art to which this subject matter pertains as the description of the invention proceeds, and many of the outstanding features and advantages will also become apparent. For the purpose of illustration I have described in detail a preferred embodiment of my invention in the form of a welding machine capable of performing the functions and giving rise to the objects set forth hereinabove, and I have set forth the details of my new method. There are illustrated in the several views substantially the construction and arrangement of parts of the said preferred embodiment, but only to help with an understanding of the invention and not by way of limitation.

In the drawings in which like characters of reference designate the same or similar parts throughout the several figures of the drawings:

Fig. 1 is a top plan view of a welding station on a conveyor at which welding apparatus constructed in accordance with my invention is located.

Fig. 2 is a vertical sectional view through the same along the line 2—2 of Fig. 1 and in the direction indicated.

Fig. 3 is a fragmentary top plan view of the right hand end of the apparatus of Fig. 1 taken below the carriage to show the construction of the gauge operating mechanism.

Fig. 4 is an end elevational view of the mechanism of Fig. 3 and taken generally looking at the same from the right hand side of Fig. 3.

Fig. 5 is a sectional view taken generally along the line 5—5 of Fig. 6 and in the indicated direction.

Fig. 6 is a view similar to that of Fig. 3, but on a much smaller scale and showing the entire length of the gauge.

Figs. 7, 9, 10, 12, 13, and 15 are progressive diagrammatic views showing the manner in which the welding process of my invention is carried out, such views being generally taken from the end of the mandrel.

Figs. 8, 11, and 14 are similar progressive views, but taken from the top of the mandrel, of the process as represented by the conditions of Figs. 7, 10, and 13 respectively.

Fig. 16 is an enlarged sectional view of a portion of Fig. 15 to show the details thereof.

Fig. 17 is a perspective view of a small metal gauge block suitable for use in a modified form of my invention.

Fig. 18 is a sectional view through the mandrel showing the manner of using the gauge block of Fig. 16.

Fig. 19 is a fragmentary detailed sectional view of a modified form of gauge slot.

Generally the process of the invention comprises placing a loop in at least one of the sheet metal lengths being welded, adjacent the line of welding, and thereby preloading the same so that the abutting edges press one against the other. The apparatus of my invention comprises a manner of achieving this pre-loading.

Considering the apparatus depicted in Fig. 1, it will be seen that I have illustrated a welding machine 20 which is mounted on a conveyor line 21 having side rails 22 mounting suitable rollers 23 therebetween. The beginning of the conveyor line 21 or the bottom in Fig. 1, may be adjacent a stock-pile of sheet metal lengths, may include flattening machinery, a shear, and other apparatus not here illustrated, all of which are useful, but not essential for the operation of my apparatus and the carrying out of my process. The lengths of sheet metal are moved down the line to the station shown where the apparatus 20 welds the leading edge of one length to the trailing edge of the previously welded length. Thereafter a large reel on the end of the line 21, that is, at the top of Fig. 1, may be rotated to take up the resulting welded member until the trailing end of the same is on the opposite side of the welding apparatus.

Returning to the apparatus illustrated in Fig. 1, the newly arrived free member is shown on the bottom and is designated 23. It may be considered as entering the front of the welding apparatus 20. The formed coil is on the top and the tail end thereof, presenting an edge to which the length 23 will be welded, is designated 24.

As shown in Fig. 2, the side rails 22 are mounted upon any suitable structural steel framework 25 supported upon the shop floor 26. The framework 25 is discontinued at the welding station and the apparatus 20 inserted. The apparatus is supported upon any suitable base 27 which is also mounted upon the floor 26. Referring now to Fig. 1, the welding apparatus 20 includes a table or mandrel 29 secured to the top of the base 27. Note that the base extends beyond the sides of the conveyor line as at 31 on the left and 32 on the right. There is a carriage 33 supported between a pair of standards 35 and 36 at the left and right of Fig. 1, said standards comprising metal plate members supported upon the top of the base 27, and said carriage comprising a generally rectangular member slidable through the said standards 35 and 36 and guided by rollers 37 mounted on the inner surfaces of each of the standards.

The carriage is arranged to be translated across the conveyor line during the welding operation, and for this purpose, there is a screw feed driving mechanism at the left hand end of the apparatus, said mechanism being designated generally 38. There are provided a motor 40, driving a reduction gear box 41 which in turn drives a pully 42 and belt 43 which drives a second pully 44. The pully 44 is secured to a screw threaded shaft 45 mounted for rotation upon a bracket 46 at one end and the standard 35 at the other end. An air-cylinder operated half-nut is adapted to be moved against the shaft 45 which is constantly rotating, the top of the air-cylinder being visible at 47 in Fig. 1. Since the air cylinder is secured to the end of the carriage 33, the carriage will move as the shaft 45 rotates.

At the right hand end of the carriage 33 there is provided a cam member 50 and same is adapted to engage and operate the switches 51, 52, 53, and 54 which control the sequence of electrical operation of the apparatus. The switches are mounted on tracks 56, 57, and 58 and are adjustable therealong to vary the sequence of operation. There is provided a stop member 60 secured at 61 to the carriage 33 and extending through the standard 35, having bumpers at the ends thereof to limit the travel of the carriage.

The carriage itself carries a plurality of welding heads 65, which are air-cylinder operated, and which are adjustably clamped to the carriage by the clamping members 66. Each head has an electrode holder 67 which has a foot 68 movable downward and into engagement with the work. The nozzle 69 and electrode 70 are also movable with the electrode holder 67 and the foot 68. Electrode guiding devices 71 are also clamped to the carriage 33.

It is intended that the mandrel 29 have the metal members 23 and 24 clamped in position so that same may be welded along their abutting juncture 72 in the manner shown for example in Figs. 13 and 15. For this purpose, each of the corner positions may have a clamping device 73 pivotally mounted upon a block 74 secured to the mandrel 29, and having a foot 75 movable into engagement with the respective corner of the members 23 and 24. The end opposite the foot 75 may have a thumb screw 76 which is adapted to be screwed against the mandrel to raise that end of the clamping device to press the foot 75 against the work.

As thus far described, the apparatus is perfectly capable of performing the welding operations. The electrodes 70 are aligned with the juncture 72 and movement of the carriage 33 will carry them all along the juncture. The welding is performed as a plurality of short welds end to end and slightly overlapping. The abutting edges of the members 23 and 24 are held in place by the clamping member 73. Any suitable gauging means may be used to align the juncture properly.

I prefer to use some manner of gauging device operable from either end of the mandrel 29. Thus I have provided the mandrel with a slot 80 extending the length thereof, and whose front edge 81 is aligned with the juncture 72 as shown in Fig. 16. At the top of the slot 80 and on the side opposite the surface 81 I provide a groove 82 of approximately the same thickness as the slot 80 so that at the top of the mandrel 29, there is formed a wide groove, and the juncture 72 between the members 23 and 24 overlies the exact center thereof so that when the welding operation is carried out, the mandrel 29 will be heated as little as possible since there will be a space beneath the weld.

In the slot 80 there is arranged a gauging member 84 which extends the length of the slot across the mandrel 29 and is adapted to move up and down, so that it can be moved out of the groove 82 and into the path of the members 23 and 24. The gauge member 84 is operated by mechanism presently to be described to move up and down to set the juncture 72. Thus, with neither member 23 nor 24 in position, the gauge member 84 is moved to protrude from the top of the mandrel 29 as shown in Fig. 7. The member 23 is moved into engagement with the gauge member 84, affixed in position, and then the gauge member 84 may be dropped and the edge of the member 24 moved against the ends of the member 23 forming the juncture directly over the center of the groove 82 and aligned with the surface 81.

In a modified form of the invention, the slot 81, gauging member 84 and the mechanism for lifting and lowering the same are eliminated. Instead there is a groove 90 in the mandrel 29 whose center is aligned with the line of electrodes 70. Small L-shaped gauging blocks 91 (see Figs. 17 and 18) are provided to be inserted and removed from the groove 90 manually. The blocks 91 each have a leg 92 whose thickness is exactly half the width of the groove 90, and extend above the surface of the mandrel 29 a distance somewhat more than the thickness of the metal of the members 23 and 24. The manner of using the blocks 91 is obvious from the figures. First the blocks 91 are placed in the groove and then the edge of one of the sheet metal members moved against the same as in Fig. 18. The edge is clamped in place, the blocks removed, and the other edge brought against the clamped edge, thereby establishing the juncture. This modification has the advantage that the first member to be positioned can be either one. In the case of the construction of Fig. 16, the first member to be positioned must be 23.

Considering now the Figs. 3 and 4, each end of the gauge member 84 extends to the opposite ends of the mandrel 29 where it is secured as by riveting to a split clamping member 95 which is mounted for vertical movement in a recess 96 formed in the mandrel end. The clamping member has an outwardly extending pin 97 which serves as means engaging with the end of a lever 98 for the purpose of raising and lowering the said gauge member 84. The lever 98 is positioned along the end 99 of the mandrel and protrudes beyond the edge of the supporting standard 27 as will be noted in Fig. 3. At this end the lever is provided with a handle 100 so that the same be grasped by the operator and the lever pivoted about the pivot pin 101 which is set into the end of the mandrel by any suitable means such as illustrated at 102 in Fig. 3. The end of the lever 98 is shown at 103 and same is provided with grooves 104 and 105 adapted to engage a conical-ended detent plunger 106 so that the gauge member 84 may be moved to either its up or down position and held at either position. The detent plunger 106 is mounted on a bracket 107 secured to the edge 99 of the mandrel 29 and includes a shaft 108 having a compressed coiled spring 109 surrounding the same and urging the plunger to the left as shown in Fig. 4 and into either of grooves 104 and 105. Note that the end of the lever 98 is provided with a horizontal slot 110 in which the pin 97 engages.

In a modified form, the slot for receiving the gauging member is formed with a width equal to twice the thickness of the gauging member 84 as shown at 80' in Fig. 19. With the construction of the lever 98 including the horizontal slot 110, obviously either of the members 23 or 24 can be brought up to the welding line first, and the gauging member is free to move laterally properly to set the edge on the welding line, which of course will be the exact center of the slot 80'.

Referring now to Fig. 2 it will be noted that some distance along the conveyor line 21 spaced both front and rear of welding apparatus 20 I have provided clamping means for engaging and holding each of the metal members 23 and 24 firmly against the bed of the conveyor line 21. Thus the front clamping mechanism is designated generally by the reference character 115 and same includes a cross bracing member 116 which may be a simple angle iron welded to the rails 22 as shown at 117 in Fig. 2, a plurality of conventional clamping devices 118 mounted upon the said cross bracing member 116 and having their operating handles ganged together by means of a bar 119 which has a handle 120. As noted in Fig. 2 this type of clamping device is operated by means of a toggle linkage. As the member 121 is pivoted in a clockwise direction upon the bracket 122 it swings the arm 123 in a counter-clockwise direction so that the adjustable foot 124 moves downwardly into substantially locked engagement with the sheet metal member 23, there being provided a cross brace 125 between the rails 22 to serve as a bearing for the bottom of the sheet metal member 23. The linkage used to achieve this action is a folding toggle type of linkage well-known in the art. It should be appreciated that any type of simple clamping device could be used in place of that illustrated.

The rear clamping mechanism 126 which is adapted to engage against the sheet metal member 24 is constructed in exactly the same manner and hence further description thereby will be eliminated. Likewise similar bracing members 116 and 125 are provided.

In carrying out my invention a large upward bend is formed in each of the metal members as shown at 127 and 128. Since these metal members being normally flat tend to remain in a flat condition there is thereby established in each of said bends a pressure biasing the ends of the members to move toward one another. The bias pressure is indicated by the arrows 129 in Fig. 2. By means of establishing such bends in the metal members 23 and 24 and providing the pressure, I am able to pre-load the same members, that is, force the free edges against one another to establish a tight and substantial perfect welding juncture 72.

In order to prevent the metal members from buckling adjacent the juncture of the edges thereto, and to assure that the weld will result in a perfectly flat juncture, I provide removable bracing members 130 and 131 in front and in rear of the juncture 23. The members shown are somewhat crude, but have been successful with a working embodiment of the invention. Obviously any similar equivalent device could be used. I have shown in Figs. 3 and 4 an example of a construction suitable for bracing the sheet metal members adjacent the juncture to prevent the metal members from bending upward. There are simple metal strap members 132 having an offset bend and secured to the mandrel 29 by studs 133. The offset bend provides a socket 134 facing away from the apparatus 20 so that the ends of the bar 130 can be slid into the sockets 134 of each of the members 132 to hold said bar in place upon the top of the member 23. The combined action of the bar 131 and the clamping mechanism 126 localizes the position of the bend 127 so that same will not interfere with the operation of the welding apparatus and so that the portion of the member 23 immediately adjacent the juncture 72 will lie perfectly flat upon the mandrel 29. I have found that the bar 130 may be considered a safety measure since the metal member 23 can be made to lie flat against the mandrel making use of the bar not always necessary.

On the opposite side of the apparatus 20, the bar 131 is adapted to be held in position by strap members 136 having the identical construction as the strap members 132 but facing in the opposite direction so that the sockets 137 face away from the juncture 72.

I shall now explain the operation of my apparatus and describe in detail the process. Basically, the process consists in setting one of the sheet metal lengths with its edge to be welded upon the juncture line, clamping the corners of the metal member in that position, applying pressure to the member by pre-loading the same, which is done preferably by forming a bend in the member and localizing the bend adjacent the juncture, with that portion of the member contiguous with the juncture lying perfectly flat. This is done with a gauging device holding the leading edge exactly on the juncture. Thereafter the gauging member may be lowered, and the edge of the second member may be moved up to the juncture and clamped in place. Thereafter, one or both members are pre-loaded and the welding is performed.

Only one of the members need be pre-loaded for good results, although it may at times be preferable to pre-load both sides.

Consider a situation where it is intended to pre-load only one side of the apparatus. Thus, let us suppose that the brake shoes or feet 68 are raised. The gauge member 84 is raised, and the leading edge of the member 23 moved up against the gauge member 84. When snug, the corners are clamped to the mandrel 29 by the clamping devices 73 with the feet 85 pressing said corners down. At this time, the edge of the member 24 may be brought up against the opposite side of the gauge member 84, the bar member 131 slipped in place to hold down the end of the member 24, and the bend 128 formed therein and clamped in position by the clamping mechanism 126. In forming the bend 128, the operators on both sides of the conveyor simply grasp opposite edges of the member and lift the same holding the metal in the bend until one or the other clamps the same to prevent the bend from traveling back along the metal. The size of the bend is not critical, nor is the distance from the clamping mechanisms to the juncture 72. Now, before clamping the corners of the pre-loaded sheet metal member 24, the gauging member is released, and the free edge of the member snaps against the clamped edge of the member 23. The clamping devices 73 on the side of the member 24 are now operated to hold the member 24 in place, and the juncture 72 is ready to be welded.

By a method as set forth above, in case the two edges forming the juncture 72 are not perfectly squared, the pressure at the center of the juncture along the line of the conveyor serves to push the two edges together at all points. The likelihood of the planes of the two members being uneven is removed because the feet 68 engage against the juncture while the welding operation is taking place.

The above procedure may be varied by clamping the corners of both members in place and forming the juncture before pre-loading either. This procedure has the additional advantage that the feet 68 can be engaged against the juncture while the pre-loading occurs and thereby prevent the climbing of one edge over the other, which could occur in the case of very flexible members 23 and 24.

In Figs. 7 to 14 I have illustrated a method of pre-loading by diagrams.

In Figs. 7 and 8, the gauging member 84 has been raised above the level of the mandrel 29 and the free edge of the member 23 has been moved up against the same snugly. In case the gauging blocks 91 are used, they have been engaged in the slot 90 with the thick portion overlying the rear side of the slot so that the member 23 can be brought up to the juncture line 72. (This is opposite to the illustration of Fig. 13 where the member 24 is being brought up first.) The corners of the member 23 are now clamped in position by the feet 75 of the clamping devices 73.

In Fig. 9, now that the member 23 is clamped in place, at least by its corners, the gauging member 84 is lowered, or in the case of the gauging blocks 91, they are pried out and set aside.

In Figs. 10 and 11, the rear member 24 has been moved up to the juncture 72 and abutted against the edge of the member 23. The corners thereof are clamped to the mandrel 29 by the feet 75 of the clamping devices 73, and in said Fig. 10 we have shown the feet 68 poised above the juncture 72.

In Fig. 12, the feet 68 have been lowered upon the juncture 72 thereby firmly holding the same upon the mandrel. This procedure is advantageous especially in the case of sheet metal which does not readily lie flat. It holds the edges down and prevents climbing as heretofore mentioned. The safety bars 130 and 131 are now inserted into their respective strap members if necessary to prevent the bends from coming too close to the juncture 72.

In Fig. 13, the bends have been formed in the members 23 and 24, the bend 127 being in the front and the bend 128 being in the rear. These bends need not both be formed since I have obtained good results by using only one. Furthermore, the order of forming them is of no importance. As explained the bends are formed manually and clamped in position by the clamping mechanisms 115 and 126 which are illustrated in Fig. 2. This serves to pre-load the members 23 and 24 thereby pressing the edges thereof one against the other and making a tight juncture 72. The direction of pressure is indicated in Fig. 14 by the arrows 129.

In Fig. 14, the welding process is taking place, and the arc is shown at 160.

The braking effect of the feet 68 is not sufficient to overcome the great pressure exerted by the pre-loaded members 23 and 24, and hence if there is any spacing or uneven parts in the juncture 72, this process will bring them into intimate engagement notwithstanding the pressure of the feet 68. However, the downward pressure of the feet 68 still serves the purpose of preventing climbing and during setting up of the juncture, holds the edges down.

The manner of releasing the various clamping and retaining devices after the welding has taken place is of no importance.

It should be obvious that the exact method to be followed in utilizing the clamping devices 73, the clamping mechanisms 115 and 126, the bars 130 and 131 and the feet 68 is capable of considerable variation in connection with the use of the gauging member 84 or the blocks 91. The principal consideration is that the members 23 and/or 24 are pre-loaded in order to form a perfect juncture 72 which will give a better weld than heretofore obtained.

It is believed that my invention has been explained sufficiently to enable one skilled in the art to understand and practice the same and readily to construct and use the apparatus thereof. It is desired to be limited only by the broadest scope of the claims appended hereto.

What is claimed is:

1. In a welding machine of the character described, and including a mandrel, means for setting the edge of a sheet metal member on a given line of said mandrel which comprises, a slot extending the length of the mandrel and having the center thereof coinciding with said line, an elongate gauging member in said slot and movable up and down therein and having an edge adapted to protrude from the slot, said edge having a thickness equal to substantially one-half the width of the slot, a lever pivoted to the mandrel and having one end arranged at the end of the slot and movable up and down thereat, said gauging member extending out of the slot and engaging the said one end of the lever so that pivotal movement of the lever will move the gauging member in and out of the slot.

2. In a welding machine of the character described, and including a mandrel, means for setting the edge of a sheet metal member on a given line of said mandrel which comprises, a slot extending the length of the mandrel and having the center thereof coinciding with said line, an elongate gauging member in said slot and movable up and down therein having an edge adapted to protrude from the slot, said edge having a thickness equal to substantially one-half the width of the slot, a lever pivoted to the mandrel and having one end arranged at the end of the slot and movable up and down thereat, said gauging member extending out of the slot and engaging the said one end of the lever so that pivotal movement of the lever will move the gauging member in and out of the slot, the said end of the lever having a horizontal slot and the gauging member having a pin slidable in said horizontal slot.

3. In a welding machine of the character described, and including a mandrel, means for setting the edge of a sheet metal member on a given line of said mandrel which comprises, a slot extending the length of the mandrel and having the center thereof coinciding with said line, an elongate gauging member in said slot and movable up and down therein having an edge adapted to protrude from the slot, said edge having a thickness equal to substantially one-half the width of the slot, a lever pivoted to the mandrel and having one end arranged at the end of the slot and movable up and down thereat, said gauging member extending out of the slot and engaging the said one end of the lever so that pivotal movement of the lever will move the gauging member in and out of the slot, and spring-pressed detent means for releasably holding the lever in positions to which same is moved.

4. In a welding machine of the character described and including a mandrel, means for positioning the edge of a sheet member on a given line of said mandrel which comprises, a slot extending the length of the mandrel and having an edge aligned with said given line, said slot having a groove in the top thereof of a thickness approximately equal to that of the slot and coextensive with said slot and disposed opposite said edge, an elongate gauging member in said slot and movable up and down therein from a point below the top surface of said mandrel and having an edge adapted to be protruded from the slot, said edge of the gauging member having a thickness equal to substantially one half of the combined width of the said slot and groove, a lever pivoted intermediate the ends thereof to the mandrel and having one end arranged at the end of the slot and movable up and down thereat, said gauging member extending out of the slot and engaging said one end of the lever so that pivotal movement of the lever will move the gauging member in and out of the slot.

ROBERT E. DAHL.

References Cited in the file of this patent
UNITED STATES PATENTS

| Number | Name | Date |
| --- | --- | --- |
| Re. 16,804 | Sessions | Nov. 29, 1927 |
| 2,023,086 | Lavallee | Dec. 3, 1935 |
| 2,121,665 | Hudson | June 21, 1938 |
| 2,143,969 | Biggert | Jan. 17, 1939 |
| 2,203,151 | Iverson | June 4, 1940 |
| 2,280,551 | Somerville | Apr. 21, 1942 |
| 2,441,507 | Peters | May 11, 1948 |
| 2,459,625 | Copp | Jan. 18, 1949 |
| 2,550,641 | Harter | Apr. 24, 1951 |